US 6,561,242 B2

(12) United States Patent
Chaen et al.

(10) Patent No.: US 6,561,242 B2
(45) Date of Patent: May 13, 2003

(54) BLOCK STRUCTURE IN PNEUMATIC TIRE

(75) Inventors: Tatsuro Chaen, Kodaira (JP); Yoji Noguchi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/788,352

(22) Filed: Feb. 21, 2001

(65) Prior Publication Data

US 2001/0022209 A1 Sep. 20, 2001

(30) Foreign Application Priority Data

Feb. 21, 2000 (JP) .......................... 2000-042856

(51) Int. Cl.[7] .................. B60C 11/12; B60C 11/13
(52) U.S. Cl. .................. 152/209.18; 152/209.21; 152/DIG. 3; 152/209.22
(58) Field of Search .................. 152/209.18, 209.21, 152/209.22, DIG. 3

(56) References Cited

U.S. PATENT DOCUMENTS

| | | | |
|---|---|---|---|
| 3,998,256 A | * | 12/1976 | Verdier |
| 5,031,680 A | * | 7/1991 | Kajikawa et al. |
| 5,287,905 A | * | 2/1994 | Caretta et al. |
| 5,772,806 A | * | 6/1998 | Moriya |
| 5,924,464 A | * | 7/1999 | White |

FOREIGN PATENT DOCUMENTS

| | | | |
|---|---|---|---|
| EP | 457233 A | | 11/1991 |
| JP | 63-43803 | * | 2/1988 |
| JP | 1-95913 | * | 4/1989 |
| JP | 2-303908 | * | 12/1990 |
| JP | 3-182814 | * | 8/1991 |
| JP | 6-166302 | * | 6/1994 |
| JP | 9-272312 | * | 10/1997 |

OTHER PUBLICATIONS

Patent Abstracts of Japan, vol. 15, No. 21 (M–1070) (Jan. 17, 1991) as it relates to JP 02–267009 issued Oct. 31, 1990 to Yokohama Rubber Co., Ltd.
Patent Abstracts of Japan, vol. 15, No. 085 (M–1087) (Feb. 27, 1991) as it relates to JP 02–303908 issued Dec. 17, 1990 to Toyo Tire & Rubber Co., Ltd.

* cited by examiner

Primary Examiner—Steven D. Maki
(74) Attorney, Agent, or Firm—Sughrue Mion, PLLC

(57) ABSTRACT

A block structure in a ground contact face of a tread portion of a pneumatic tire comprises blocks defined by circumferential grooves and lateral grooves and a sipe formed in each surface of the blocks in a block row at least located near to a center of the tread and opening at least one end thereof to the respective circumferential groove, in which the sipe is opened through a width-widened part to the circumferential groove and a depth of the width-widened part is made shallower than a depth of a deepest part of the sipe.

12 Claims, 3 Drawing Sheets

Comparative

BLOCK STRUCTURE IN PNEUMATIC TIRE

BACKGROUND OF THE INVENTION

1. Field of the Invention

This invention relates to a block structure in a tread portion of a pneumatic tire capable of improving steering stability on a wet road surface and resistance to hydroplaning while maintaining a wear resistance of a block.

2. Description of Related Art

In order to mainly improve the steering stability on a wet road surface, it has widely been practiced to form various kinds of sipes in a block constituting a ground contact face of a tread portion in a pneumatic tire.

However, when the sipe is formed in the block constituting the ground contact face to improve the steering stability on the wet road surface, the rigidity of the block lowers and hence there is caused a problem that the wear resistance is degraded due to the lowering of the rigidity.

SUMMARY OF THE INVENTION

It is, therefore, an object of the invention to solve the above problem of the conventional technique and to provide a block structure in a tread portion of a pneumatic tire improving steering stability on a wet road surface and resistance to hydroplaning while maintaining a wear resistance of a block.

According to the invention, there is the provision of a block structure in a ground contact face of a tread portion of a pneumatic tire comprising blocks defined by circumferential grooves extending in a circumferential direction and lateral grooves extending in a widthwise direction at the ground contact face and a sipe formed in each surface of the blocks in a block row at least located near to a center of the tread and extending in the widthwise direction and opening at least one end thereof to the respective circumferential groove, in which the sipe is opened through a width-widened part to the circumferential groove and a depth of the width-widened part is made shallower than a depth of a deepest part of the sipe.

The wear resistance of the block is degraded due to the fact that the rigidity of the block is lowered by the sipe. Such a lowering of the rigidity in the block is largely affected by a depth of a portion of the sipe that is opened to the circumferential groove. In the invention, therefore, the lowering of the block rigidity is controlled by opening the sipe to the circumferential groove through the width-widened part having a depth shallower than the depth of the sipe, whereby the degradation of the wear resistance in the block can effectively be prevented.

On the other hand, the drainage performance is degraded due to the fact that the depth of the width-widened part is made shallower than the depth of the sipe. In the invention, however, such a degradation is superfluously offset by making the width of the width-widened part wider than the width of the sipe.

According to the above block structure, therefore, the degradation of the wear resistance in the block can be prevented under the condition that the width-widened part opening to the circumferential groove is made shallower than the depth of the sipe, while the steering stability on the wet road surface and resistance to hydroplaning can advantageously be improved by making the width of the width-widened part wider than that of the sipe.

In a preferable embodiment of the invention, the depth of the width-widened part is 25–50% of a depth of a deepest part of the sipe, and further the depth of the width-widened part is 20–30% of a height of the block.

In the former case, when the depth is less than 25%, there is a fear that the sufficient drainage performance is not obtained, while when it exceeds 50%, the rigidity of the block is too low and hence the wear resistance lowers and the steering stability on the wet road surface is apt to be degraded. These facts are true even in the latter case.

In another preferable embodiment of the invention, the width of the width-widened part is 3–5 times a width of the sipe being, for example, about 0.7–1.2 mm, and a length of the width-widened part in the widthwise direction of the block is 10–30% of the width of the block.

In any case, when the value is less than the lower limit, there is a fear that the sufficient drainage performance can not be ensured, while when the value exceeds the upper limit, the ground contact area is too small and the steering stability on the wet road surface is apt to be degraded.

In the other preferable embodiment of the invention, the depth of the sipe is made deepest at a central part in its extending direction to prevent the lowering of the block rigidity. In this case, the depth of the deepest part is 2–3 times a depth of a shallowest part in order to ensure the sufficient drainage performance and prevent the lowering of the block rigidity for ensuring the steering stability on the wet road surface.

BRIEF DESCRIPTION OF THE DRAWINGS

The invention will be described with reference to the accompanying drawings, wherein.

DETAILED DESCRIPTION OF THE INVENTION

Figure 1:
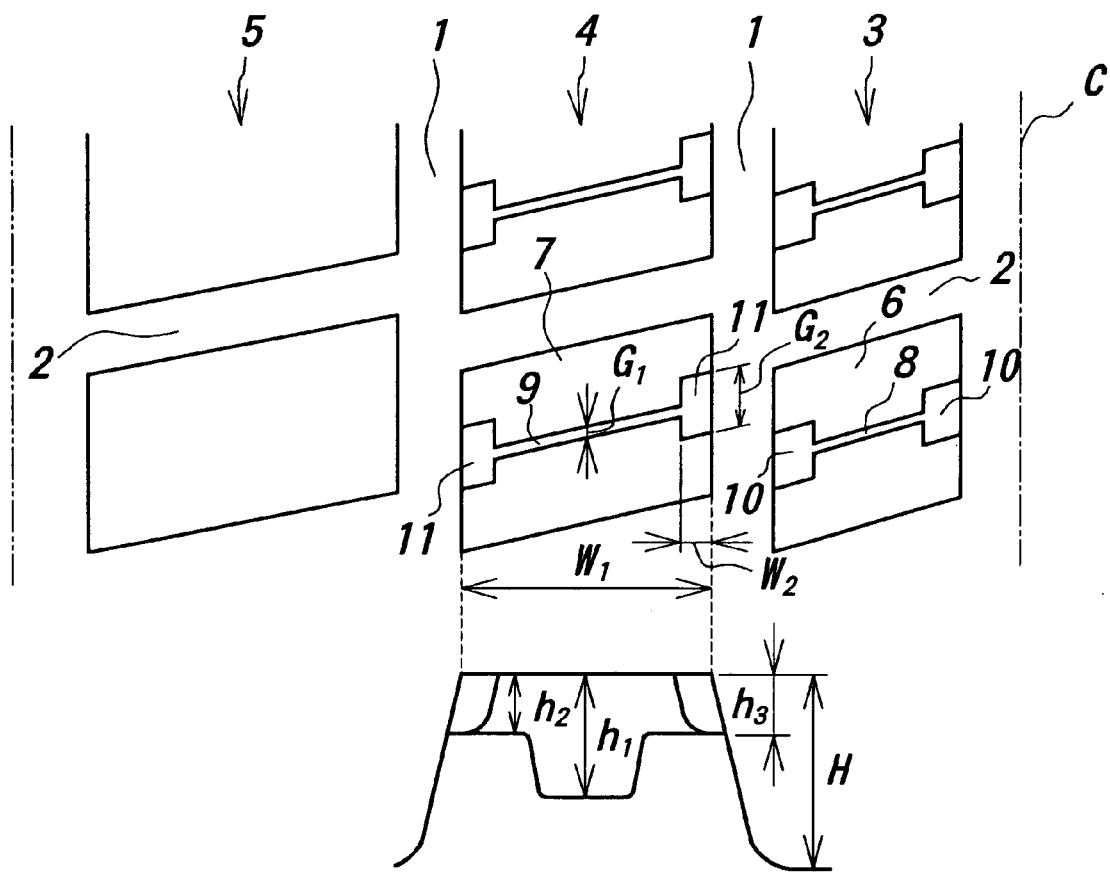
FIG. 1 is a diagrammatically developed view of a half of a ground contact face of a tread portion in an embodiment of the tire according to the invention.

In FIG. 1 is shown a developed view of a left-half of a ground contact face of a tread portion in an embodiment of the tire according to the invention, wherein numeral 1 is a circumferential groove extending in the ground contact face in a circumferential direction of the tread portion and numeral 2 a lateral groove extending in a widthwise direction of the tread portion.

As shown in FIG. 1, three block rows 3, 4, 5 of blocks defined and formed by these grooves 1 and 2 are existent in the left-half of the ground contact face. Among them, each of blocks 6, 7 in two block rows 3, 4 located near to a tread center C is provided at its middle position in the circumferential direction with a sipe 8, 9 extending substantially in parallel to a side edge of the block and inclining somewhat upwards to the right. Each end of such a sipe 8, 9 is opened to the respective circumferential groove 1 through a width-widened part 10, 11 widening a groove width substantially symmetrically with respect to a centerline of the sipe.

In the sipe 8, 9, a central part in the extending direction is deepest, and each end part continuously connecting to the width-widened part 10, 11 is shallowest. Preferably, a depth $h_1$ of the deepest part is 2–3 times a depth $h_2$ of the shallowest part.

And also, it is favorable that a depth $h_3$ of the width-widened part 10, 11 is 25–50% of the depth $h_1$ of the deepest part in the sipe 8, 9. Furthermore, it is favorable that the depth $h_3$ of the width-widened part 10, 11 is 20–30% of a height H of the block 6, 7.

Preferably, the width-widened part 10, 11 has a width $G_2$ corresponding to 3–5 times a width $G_1$ of the sipe 8, 9 in the circumferential direction and a widthwise length $W_2$ corresponding to 10–30% of a width $W_1$ of the block 6, 7 in the widthwise direction.

According to the above block structure, the depth of the sipe 8, 9 is made shallower at both end parts near to the circumferential groove 1, whereby the lowering of the block rigidity and hence premature wearing of the block 6, 7, degradation of the steering stability and the like can effectively be prevented. And also, the sipe 8, 9 is opened to the respective circumferential groove 1 through the width-widened part 10, 11 having a width wider than that of the sipe 8, 9, whereby the degradation of the drainage performance due to the shallow depth of the width-widened part 10, 11 can superfluously be offset and hence the steering stability on the wet road surface and resistance to hydroplaning can effectively be improved.

Moreover, a corner portion of the width-widened part 10, 11 adjacent to the sipe 8, 9 may be chamfered in a straight or a curved form seeing a developed view of the width-widened part 10, 11, whereby a fear of concentrating stress in the block 6, 7 can effectively be removed.

The following examples are given in illustration of the invention and are not intended as limitations thereof.

With respect to the following tires are evaluated the steering stability on wet road surface, resistance to hydroplaning and the wear resistance as follows.

Figure 2:
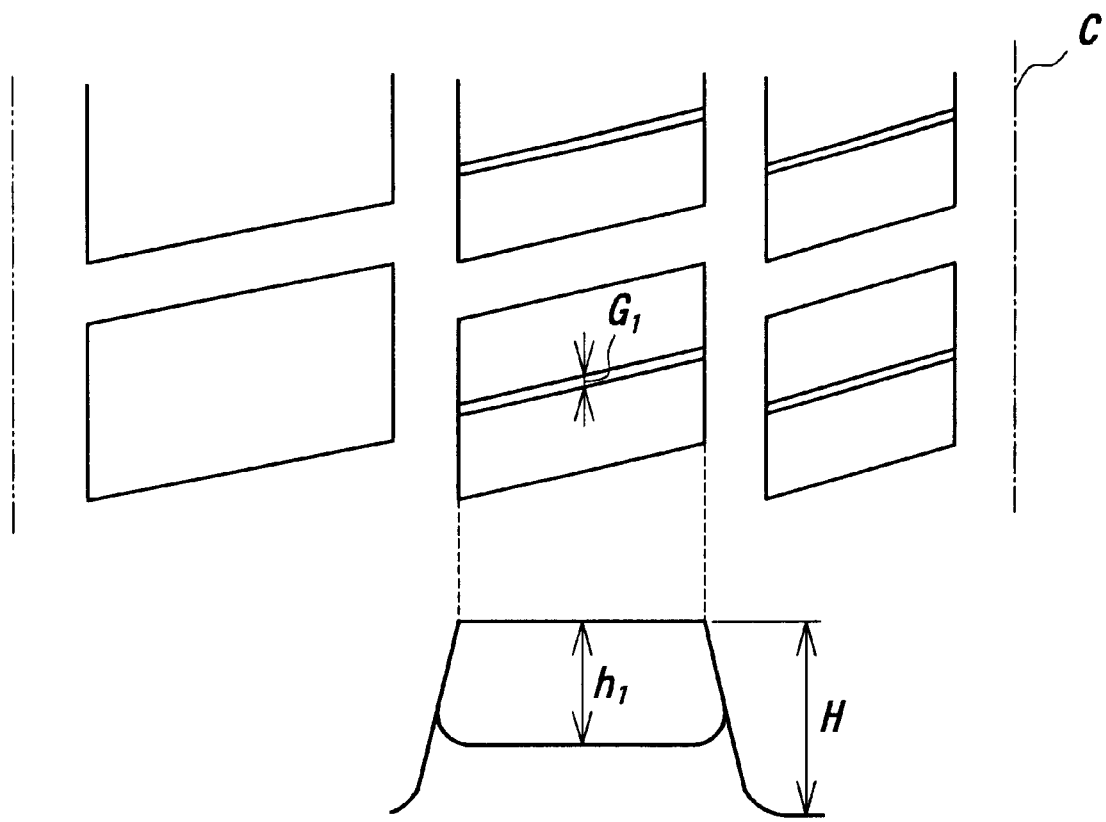
FIG. 2 is a diagrammatically developed view of a half of a ground contact face of a tread portion in the conventional tire.
Figure 3:
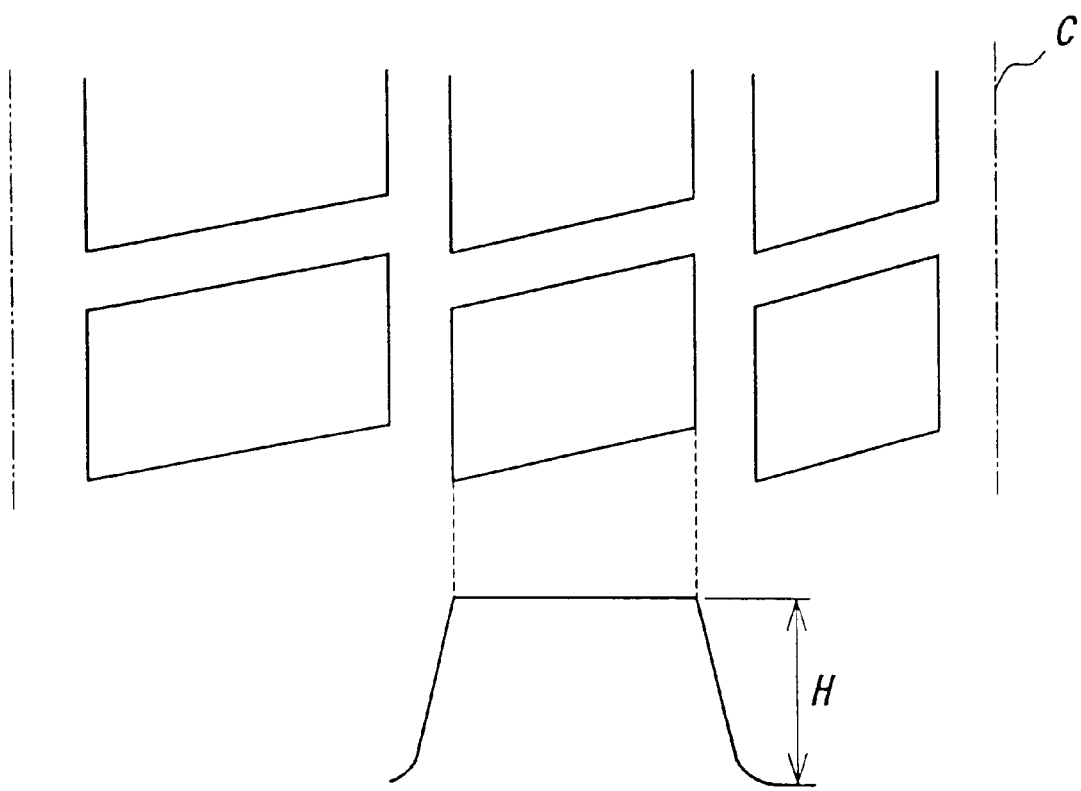
FIG. 3 is a diagrammatically developed view of a half of a ground contact face of a tread portion in a comparative tire.

There are provided three tires having a tire size of 195/65R15, wherein a tire of Example has a structure shown in FIG. 1 and dimensions shown in Table 1, and a conventional tire has a structure shown in FIG. 2 and dimensions shown in Table 1, and a comparative tire has a structure shown in FIG. 3 and dimensions shown in Table 1.

TABLE 1

|  |  | Example tire | Conventional tire | Comparative tire |
| --- | --- | --- | --- | --- |
| Block width | $W_1$ | 20 | 20 | 20 |
| Length of width-widened part | $W_2$ | 4 | — | — |
| Sipe width | $G_1$ | 0.7 | 0.7 | — |
| Width of width-widened part | $G_2$ | 3 | — | — |
| Block height | H | 8 | 8 | 8 |
| Depth of width-widened part | $h_3$ | 2 | — | — |
| Sipe depth (deepest) | $h_1$ | 6 | 6 | — |
| Sipe depth | $h_2$ | 3 | — | — |

The steering stability on wet road surface is evaluated by measuring a cornering limit speed on a wet road surface, and the resistance to hydroplaning is evaluated by measuring a speed generating the hydroplaning on a road having a water depth of 10 mm, and the wear resistance is evaluated by measuring a worn quantity of a block after the tire is actually run under a load corresponding to two crewmen over a distance of 5000 km. The evaluated results are shown in Table 2. Moreover, the numerical values in Table 2 are represented by an index, wherein the larger the index value, the better the performance.

TABLE 2

|  | Example tire | Conventional tire | Comparative Tire |
| --- | --- | --- | --- |
| Steering stability on wet road surface | 100 | 90 | 70 |
| Resistance to hydroplaning | 100 | 90 | 80 |
| Wear resistance | 90 | 80 | 100 |

As seen from Table 2, in the example tire, the steering stability on wet road surface and the resistance to hydroplaning is considerably improved while highly maintaining the wear resistance of the block.

As mentioned above, according to the invention, the steering stability on wet road surface and resistance to hydroplaning can effectively be improved while highly maintaining the wear resistance of the block.

What is claimed is:

1. A pneumatic tire comprising a tread portion having a ground contact face and blocks defined by circumferential grooves extending in a circumferential direction and lateral grooves extending in a widthwise direction at the ground contact face and a sipe formed in each surface of the blocks in a block row at least located near to a center of the tread and extending in the widthwise direction and opening at least one end thereof to the respective circumferential groove, in which the sipe is sandwiched between width-widened parts and is opened through at least one of the width-widened parts to the circumferential groove and a width of the sipe is narrower than a width of said at least one of said width-widened parts and a depth of the at least one of said width-widened parts is shallower than a death of the sipe.

2. A pneumatic tire according to claim 1, wherein the depth of the width-widened part is 25–50% of a depth of a deepest part of the sipe.

3. A pneumatic tire according to claim 2, wherein the width of the width-widened part is 3–5 times a width of the sipe.

4. A pneumatic tire according to claim 2, wherein a length of the width-widened part in the widthwise direction of the block is 10–30% of the width of the block.

5. A pneumatic tire according to claim 1 or 2, wherein the depth of the width-widened part is 20–30% of a height of the block.

6. A pneumatic tire according to claim 5, wherein the width of the width-widened part is 3–5 times a width of the sipe.

7. A pneumatic tire according to claim 5, wherein a length of the width-widened part in the widthwise direction of the block is 10–30% of the width of the block.

8. A pneumatic tire according to claim 1, wherein the width of the width-widened part is 3–5 times a width of the sipe.

9. A pneumatic tire according to claim 8, wherein a length of the width-widened part in the widthwise direction of the block is 10–30% of the width of the block.

10. A pneumatic tire according to claim 1, wherein a length of the width-widened part in the widthwise direction of the block is 10–30% of the width of the block.

11. A pneumatic tire according to claim 1, wherein the depth of the sipe is made deepest at a central part in its extending direction to prevent the lowering of the block rigidity.

12. A pneumatic tire according to claim 11, wherein a depth of the deepest part of the sipe is 2–3 times a depth of a shallowest part of the sipe.

* * * * *